United States Patent
Jansen et al.

(10) Patent No.: US 11,603,319 B2
(45) Date of Patent: Mar. 14, 2023

(54) SYNTHESIS METHOD FOR PRODUCING A CALCIUM ZIRCONATE-CONTAINING MATERIAL AND BATCH AND COARSE CERAMIC REFRACTORY PRODUCT HAVING A PRE-SYNTHESIZED CALCIUM ZIRCONATE-CONTAINING GRANULAR MATERIAL

(71) Applicant: Refratechnik Holding GmbH, Ismaning (DE)

(72) Inventors: Helge Jansen, Friedland (DE); Constantin Jahn, Freiberg (DE); Christos Georgios Aneziris, Freiberg (DE)

(73) Assignee: Refratechnik Holding GmbH, Ismaning (DE)

( * ) Notice: Subject to any disclaimer, the term of this patent is extended or adjusted under 35 U.S.C. 154(b) by 169 days.

(21) Appl. No.: 16/767,557

(22) PCT Filed: Nov. 28, 2018

(86) PCT No.: PCT/EP2018/082904
§ 371 (c)(1),
(2) Date: May 27, 2020

(87) PCT Pub. No.: WO2019/106052
PCT Pub. Date: Jun. 6, 2019

(65) Prior Publication Data
US 2021/0171358 A1    Jun. 10, 2021

(30) Foreign Application Priority Data
Dec. 1, 2017 (DE) ............... 10 2017 128 626.8

(51) Int. Cl.
*C01G 25/00* (2006.01)
*B22D 41/02* (2006.01)
(Continued)

(52) U.S. Cl.
CPC ........... *C01G 25/006* (2013.01); *B22D 41/02* (2013.01); *F27D 1/0033* (2013.01);
(Continued)

(58) Field of Classification Search
None
See application file for complete search history.

(56) References Cited

U.S. PATENT DOCUMENTS 5,427,722 A * 6/1995 Fouts .................... C04B 35/622
264/87

FOREIGN PATENT DOCUMENTS

| CN | 101759229 A | 6/2010 |
|---|---|---|
| CN | 102001705 A | 4/2011 |

(Continued)

OTHER PUBLICATIONS

Machine translation of Hajime et al., JP 2005200297A (Year: 2005).*

(Continued)

*Primary Examiner* — Melissa S Swain
*Assistant Examiner* — Keling Zhang
(74) *Attorney, Agent, or Firm* — Greer, Burns & Crain, Ltd.

(57) ABSTRACT

A synthesis method for producing a refractory oxide-ceramic material of $CaZrO_3$, in particular in the form of a refractory granular material that is preferably mechanically (Continued)

comminuted, in particular crushed and/or ground, as well as to a batch and a coarse ceramic, shaped or unshaped, refractory product containing at least one pre-synthesized refractory calcium zirconate-containing granular material.

38 Claims, 2 Drawing Sheets

(51) Int. Cl.
*F27D 1/00* (2006.01)
*F27B 14/08* (2006.01)

(52) U.S. Cl.
CPC ...... *C01P 2002/60* (2013.01); *C01P 2002/72* (2013.01); *C01P 2006/10* (2013.01); *C01P 2006/11* (2013.01); *C01P 2006/80* (2013.01); *F27B 2014/0843* (2013.01)

(56) References Cited

FOREIGN PATENT DOCUMENTS

| | | | |
|---|---|---|---|
| DE | 102012003478 A1 | 8/2013 | |
| JP | H09142929 A | 6/1997 | |
| JP | 2005200297 A | 7/2005 | |
| SU | 920048 A1 | 4/1982 | |
| SU | 1188147 A1 | 10/1985 | |
| WO | 2013124183 A2 | 8/2013 | |
| WO | 2013124183 A3 | 8/2013 | |
| WO | WO-2013124183 A2 * | 8/2013 | ............ C01G 25/00 |
| WO | 20190106052 A1 | 6/2019 | |

OTHER PUBLICATIONS

Machine translation of Christos et al., WO 2013124183 A2 (Year: 2013).*
Machine translation of Luo et al., CN102001705 A (Year: 2011).*
Machine translation of Yukiyoshi et al., JP H09142929 A (Year: 1997).*
Process Heating, High-Temperature Processing with Calciners, https://www.process-heating.com/articles/89334-high-temperature-processing-with-calciners#:~:text=A%20calciner%20performs%20all%20high,of%20any%20type%20of%20material. (Year: 2013).*
PCT App. No. PCT/EP2018/082904 International Search Report dated Feb. 11, 2019 (16 pages).
PCT Application No. PCT/EP2018/082904: Written Opinion dated Jun. 2, 2020 (9 pages).
M.R. Nadler and E.S. Fitzsimmons, Preparation and Properties of Calcium Zirconate, Journal of the American Ceramic Society, Jun. 1955, pp. 214-217 (4 pages), vol. 38, No. 6.
Schaffoner et al, "Influence of in Situ Phase Formation on Properties of Calcium Zirconate Refractories," Journal of the European Ceramic Society, Elsevier Science Publishers, Barking, Essex, GB, Bd. 37, Nr. 1, Aug. 25, 2016 (Aug. 25, 2016), Seiten 305-313, XP029738857, ISSN: 0955-2219, DOI: 10.1 016/J.JEURCERAMSOC.2016.08.017 (9 pages).
Jinhua Kuang, Ceramic Production Process Technology, p. 216, Wuhan University of Technology, 2013, 12.

* cited by examiner

SYNTHESIS METHOD FOR PRODUCING A CALCIUM ZIRCONATE-CONTAINING MATERIAL AND BATCH AND COARSE CERAMIC REFRACTORY PRODUCT HAVING A PRE-SYNTHESIZED CALCIUM ZIRCONATE-CONTAINING GRANULAR MATERIAL

RELATED APPLICATIONS

This application is a U.S. National Phase under 35 U.S.C. § 371 of International Application No. PCT/EP2018/082904, filed Nov. 28, 2018, which claims priority to German Patent Application No. 10 2017 128 626.8, filed Dec. 1, 2017, the entireties of which are hereby incorporated by reference.

FIELD OF THE INVENTION

The present invention relates to a synthesis method for producing a refractory oxide-ceramic material of $CaZrO_3$, in particular in the form of a refractory, preferably mechanically comminuted, in particular crushed and/or ground, granular material, as well as to a batch and a coarse ceramic shaped or unshaped refractory product containing at least one pre-synthesized calcium zirconate-containing granular material.

In the context of the present invention, the term "refractory" is not intended to be limited to the definition according to ISO 836, or DIN 501060, which define a pyrometric cone equivalent of >1500° C. Refractory products in the sense of the present invention have a compression softening point $T_{0.5}$ according to DIN EN ISO 1893: 2009-09 of $T_{0.5} \geq 600°$ C., preferably $T_{0.5} \geq 800°$ C. Accordingly, refractory, or fire-resistant, grainy materials, or granular materials in the sense of the present invention, are those materials, or granular materials, that are suitable for a refractory product having the above-mentioned compression softening point $T_{0.5}$. The refractory products according to the present invention are used for the protection of aggregate constructions in aggregates in which temperatures between 600 and 2000° C., in particular between 1000 and 1800° C., predominate.

As is known, coarse ceramic products are products produced from granular materials having grain sizes up to 6 mm, and in particular cases even up to 25 mm (see Gerald Routschka/Hartmut Wuthnow, Practical Handbook "Feuerfeste Werkstoffe [Refractory materials]," 5th ed., Vulkan-Verlag (hereinafter referred to simply as "Practical Handbook"), ch. 2).

In the sense of the present invention, the term "granular material" or "grainy material" comprises a pourable material consisting of a large number of small, solid grains. If the grains have a grain size 200 μm, the granular material is a meal or powder. If the grains are produced by mechanical comminution, e.g. crushing and/or grinding, the granular material is a crushed granulate or crushed granular material. However, a granular material may also comprise granulate grains or pellet grains that are produced by granulation or pelleting without mechanical comminution. The grain distribution of the granular material is usually adjusted by sieving.

Among the coarse ceramic products, a distinction is additionally made between shaped and unshaped products.

Shaped coarse ceramic products are unfired, tempered, or ceramically fired products, in particular bricks or plates, preferably produced in a ceramics factory. They have a defined geometry and are ready for use. The shaping takes place e.g. by pressing, stamping, ramming, or slip casting. The shaped products, in particular the bricks, are walled, with mortar or without mortar (laid tightly against one another), e.g. in order to form a lining. The production process for coarse ceramic shaped products is standardly classified into the following steps (Practical Handbook, page 15/point 2.1):
 preparation
 mixing
 shaping
 drying
 thermal treatment up to 800° C., firing or sintering
 post-treatment (if necessary)

The unshaped products according to the present invention are products that are brought into their final form, usually by the user, from an unshaped mass or from lumps, e.g. by casting, vibration, stoking, ramming, or injection. Unshaped products are placed in larger areas at the location of use, usually behind molds, and, after hardening, form a part of the lining. The unshaped products are for example injection masses, ramming masses, casting masses, vibration masses, or potting masses.

Both the shaped and the unshaped products according to the present invention are produced in a known manner from a coarse ceramic batch.

BACKGROUND OF THE INVENTION

Calcium zirconate is the stable stoichiometric composition in the phase diagram $CaO$—$ZrO_2$. It has a high melting temperature of 2368° C., and is resistant to alkali corrosion. Because it occurs only rarely as a mineral in nature, calcium zirconate has to be synthesized for technical applications. This pre-synthesis has the goal of producing a phase-pure material, i.e. a material of 100% calcium zirconate. Because this ensures good properties of the refractory products produced from the pre-synthesized material.

DE 10 2012 003 483 discloses a ceramic product on the basis of calcium zirconate, that is resistant to thermal shock and to corrosion, wherein the structure of the product consists of pre-synthesized crushed calcium zirconate-containing granulate. The crushed granulate has a $ZrO_2/CaO$ ratio between 1.6:1 and 1:1.5, and a grain size of 100 μm to 6 mm. In addition, the crushed granulate has a fraction of >50 mass %. In addition, the product has a binder matrix, surrounding the crushed granulate and sintered at >1300° C., of fine-grained calcium zirconate and/or zirconium dioxide, with grain sizes between 50 nm and 150 μm.

The crushed calcium zirconate-containing granulate can be a sintered and broken-up crushed granulate based on $CaZrO_3$ synthesized from $CaCO_3$ and $ZrO_2$, wherein the sintered crushed granulate has been sintered at temperatures above 1300° C.

In addition, the binder matrix can be produced from a mixture of calcium carbonate having a grain size of 50 nm to 150 μm and unstabilized zirconium dioxide having a grain size between 50 nm and 150 μm.

In addition, the crushed granulate is preferably produced using slip casting technology. However, the production can also be done using plastic molding or pressing technology.

DE 10 2012 003 478 A1 relates to the use of an oxide-ceramic material comprising at least 75 wt % $CaZrO_3$ and a maximum of 25 wt % $ZrO_2$ as a lining material for coal gasification plants. The production of the material is done for example using slip casting technology. For this purpose, according to DE 10 2012 003 478 A1 $ZrO_2$ is mixed with $CaCO_3$ and further additives, and with the addition of water is processed to form a slurry. The molar $ZrO_2/CaCO_3$ ratio is between 1.6:1 and 1:1.5. The slurry is poured into a plaster mold that removes the water from the slurry so that shaped bodies are obtained. The shaped bodies are dried and are subsequently sintered at temperatures between 800 and 1700° C., preferably 1300 to 1500° C., under oxidizing or reducing conditions.

According to another method disclosed in DE 10 2012 003 478 A1, the slip-cast test bodies of $CaZrO_3$ are crushed into different grain classes, and the granular material is processed, using further additives, to form a mass capable of casting or vibration. This mass, consisting of coarse-grained and fine-grained $CaZrO_3$ as well as of small amounts of $ZrO_2$, is subsequently dried and sintered. In this way, according to DE 10 2012 003 478 A1, large components can be produced having an open porosity of up to 20%.

DE 10 2012 003 478 A1 also includes an exemplary embodiment in which the obtained material, after sintering at 1400° C., comprises 64% $CaZrO_3$ and 36% $Ca_{0.15}Zr_{0.85}O_{1.85}$.

The article "Chemical Synthesis of Pure and Gd-doped $CaZrO_3$ Powders," by I. Erkin Gonenli and A. Cuneyt Tas, describes the synthesis of phase-pure $CaZrO_3$ powder. The production takes place from aqueous solutions of calcium chloride ($CaCl_2.2H_2O$) and zirconium oxide chloride ($ZrOCl_2.8H_2O$) in corresponding volumetric amounts. The formation of calcium zirconate was achieved via two different chemical synthesis paths: self-propagating combustion synthesis and precipitation in the presence of EDTA via acid-base titration.

SUMMARY OF THE PRESENT INVENTION

An object of the present invention is to provide a simple and low-cost method that is economical and ecologically harmless for the synthesis of a, preferably phase-pure, calcium zirconate material, preferably in the form of a calcium zirconate-containing granular material.

A further object is the provision of a batch for the production of a coarse ceramic unshaped or shaped refractory product having at least one such synthesized calcium zirconate-containing granular material, and of such a coarse ceramic refractory product.

These objects may be achieved by a synthesis method having the features of various embodiments described herein.

DESCRIPTION OF THE DRAWINGS

In the following, the present invention is explained in more detail exemplarily on the basis of a drawing.

DETAILED DESCRIPTION OF THE PRESENT INVENTION

Figure 1:
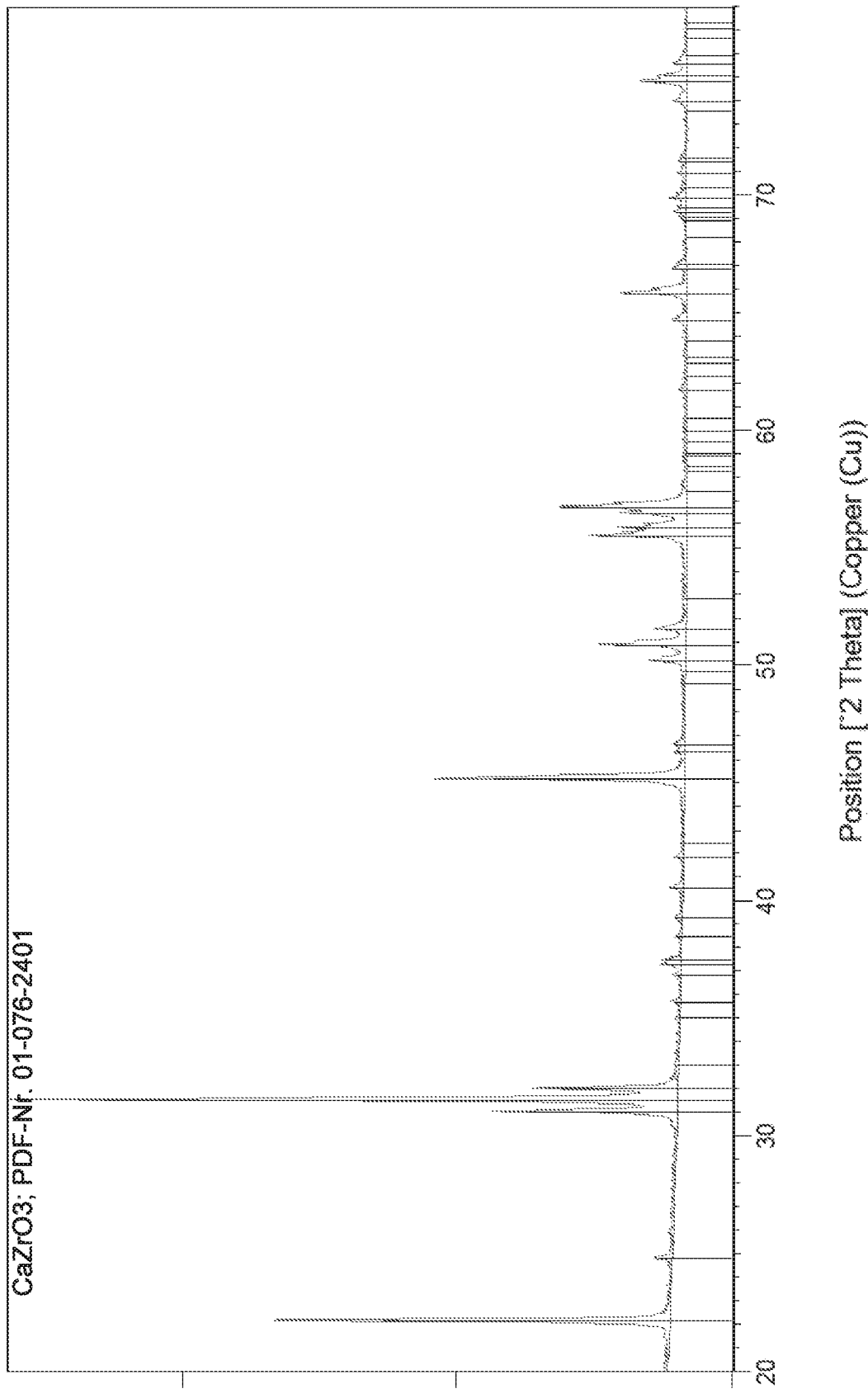
FIG. 1 shows an x-ray phase diagram of a granular material, produced according to exemplary embodiment 1, of phase-pure calcium zirconate material.
Figure 2:
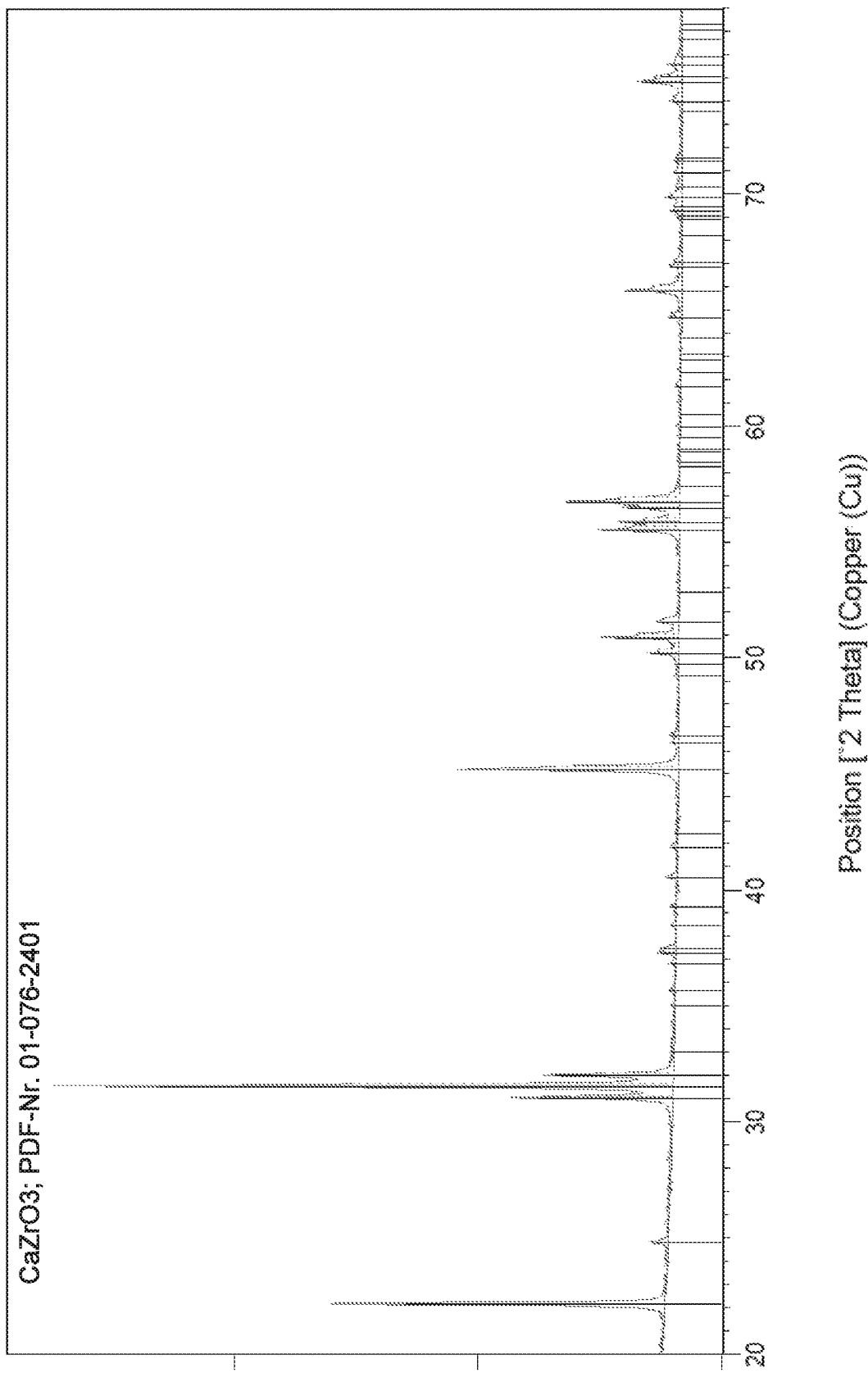
FIG. 2 shows an x-ray phase diagram of a shaped body produced according to the present invention, according to exemplary embodiment 2.

In the context of the present invention, it was surprisingly found out that it is possible to produce a, preferably phase-pure, calcium zirconate-containing material by press shaping and sintering from a mixture that consists exclusively of at least one mealy raw material component containing Ca, at least one mealy raw material component containing $ZrO_2$, and water, and that has a water content of >5 to 10 wt %, preferably 7 to 8 wt %, relative to the dry mass of the mixture.

The synthesis method according to the present invention thus has the following method steps:
  a) producing the mixture that consists of the at least one mealy raw material component containing Ca, the at least one mealy raw material component containing $ZrO_2$, and water, with a water content of >5 to 10 wt %, preferably 7 to 8 wt %, relative to the dry mass of the mixture,
  b) pressing the mixture to form a green shaped body,
  c) preferably drying the green shaped body,
  d) sintering the shaped body,
  e) if applicable, mechanical comminution, preferably crushing and/or grinding, of the sintered material to form a granular material.

According to the present invention, the mixture thus contains a larger amount of water than is standard in conventional press shaping. In addition, according to the present invention the mixture does not contain any further components, in particular, it contains no binders and/or pressing aids.

In the context of the present invention, it was surprisingly found out that the binders and/or pressing aids, even when present only in very small quantities, nonetheless disturb the synthesis of the calcium zirconate. For example, it has turned out that organic temporary binders and/or pressing aids change the previously set molar ratio $CaO/ZrO_2$ during the firing. It is presumed that during the firing the organic binders and/or pressing aids release CO and/or $CO_2$, which reduces the Ca contained in the raw materials. The reduced Ca then in turn goes into a gas phase and vaporizes, so that the molar ratio $CaO/ZrO_2$ changes. These reactions take place beginning from a temperature of approximately 550° C. As a result, the organic binders and/or pressing aids, even if they are present only in very small quantities, interfere with the synthesis in particular in such a way that the production of a phase-pure material is not possible.

The high water content according to the present invention provides, on the one hand, an adequate cohesion of the green shaped body even without binders. In addition, however, it has surprisingly turned out that the high water content in the mixture also contributes to making it possible to produce a phase-pure material. Because, due to the high water content in the mixture, during the sintering process a water vapor atmosphere obtains that supports the sintering process. Due to the water vapor atmosphere, the surface tension of the individual meal grains of the raw materials is reduced, which improves their sinterability. In addition, the water vapor atmosphere surprisingly counteracts the vaporization of CaO.

In order to enable the production of a phase-pure material, the molar ratio $CaO/ZrO_2$ in the mixture should in addition be substantially equimolar. That is, the molar ratio $CaO/ZrO_2$ in the mixture is preferably 1:1. However, the molar ratio is, at least, preferably 1.5:1 to 1:1.6. In the determination of the molar ratio, in each case a pure raw material is assumed as an idealization. Taking the desired ratio as a basis, the weight ratio is calculated via the molar masses. Of course, here it is taken into account that the CaO-carriers also contain other components, such as $CO_2$ in the case of $CaCO_3$.

The used Ca raw material component is preferably a raw material component containing $CaCO_3$ and/or containing CaO and/or containing $Ca(OH)_2$ and/or containing $CaC_2$. Preferably, a $CaCO_3$ raw material component is used.

The CaCO₃ raw material component is preferably natural, ground calcium carbonate (GCC) or synthetic, precipitated calcium carbonate (PCC), or chalk. The use of PCC is particularly preferred, due in particular to its high purity. The production of PCC preferably takes place by the reaction of carbon dioxide with milk of lime or with a hydrated lime suspension. The hydrated lime suspension is produced either by dissolving quicklime or by dispersing calcium hydroxide in water.

The CaO raw material component is preferably quicklime.

Hydrated lime is preferably used as the Ca(OH)₂ raw material component.

Synthetically produced zirconium dioxide is preferably used as the ZrO₂ raw material component. Preferably, the zirconium dioxide is not stabilized (monoclinic). However, it may also be stabilized.

In addition, the raw material components each preferably have a purity of at least 96 wt %, preferably at least 99 wt %. That is, the minimum content of each compound (CaCO₃, CaO, Ca(OH)₂, CaC₂, or ZrO₂) is preferably at least 96 wt %, preferably at least 99 wt %, determined in each case by x-ray fluorescence analysis (XRF) according to DIN 51001:2003.

In addition, the Ca raw material component has a grain size of 200 μm, preferably ≤50 μm, particularly preferably between 200 nm and 10 μm, according to DIN EN 725-5:2007. And the average grain diameter of the Ca raw material component is preferably 500 nm to 5 μm, preferably 0.8 to 1 μm.

The ZrO₂ raw material component preferably has a grain size of 200 μm, preferably ≤150 μm, particularly preferably between 200 nm and 10 μm, according to DIN EN 725-5:2007. And the average grain diameter ($d_{50}$) of the ZrO₂ raw material component is preferably 500 nm to 5 μm, preferably 0.7 to 1 μm.

The grain sizes and the average grain diameter are determined using laser granulometry according to DIN EN 725-5:2007. For this purpose, in each case the meal is dispersed using ultrasound, preferably in ethanol.

As explained above, the shaping of the mixture consisting exclusively of the raw material components and water to form green shaped bodies takes place according to the present invention by pressing. The pressing preferably takes place at a molding pressure of 30 to 150 N/mm², preferably 50 to 80 N/mm². In addition, the pressing preferably takes place by uniaxial pressing. However, it can also be done by isostatic pressing or vibration pressing or briquetting or pelleting.

The mixing preferably takes place in an intensive mixer, using the counterflow method (agitator and plate rotate in opposite directions).

Preferably, in addition cuboidal green shaped bodies are produced, in particular in conventional brick sizes. Preferably, the green pressed shaped bodies have the following dimensions:

|  |  | preferably |
|---|---|---|
| Height | 20 to 100 mm | 25 to 75 mm |
| Length | 20 to 300 mm | 150 to 250 mm |
| Width | 20 to 150 mm | 25 to 100 mm |

In addition, the green shaped bodies preferably have a bulk density, determined according to DIN EN 993-17:1999, of 2.0 to 3.0 g/cm³, preferably 2.1 to 2.5 g/cm³, and/or a porosity according to DIN 66133:1993-06 of 30 to 60 vol %, preferably 40 to 50 vol %.

To enable the green shaped bodies to be handled, they preferably have a cold bending strength according to DIN EN 993-6:1995-04 of at least 1 MPa.

After the pressing, the green shaped bodies are dried, as stated above. The drying preferably takes place until there is a residual moisture between 0 and 2 wt %, in particular between 0 and 0.5%, determined according to DIN 51078:2002-12. The green shaped bodies are preferably dried at between 25 and 110° C., in particular between 100 and 105° C., for a time duration of 4 to 24 h, preferably 12 to 24 h.

After the drying, according to the present invention the sintering takes place. The sintering preferably takes place with a holding phase at a final temperature of 1200 to 1800° C., preferably 1400 to 1650° C., for a duration of 2 to 10 h, preferably 4 to 6 h. Preferably, the heating takes place with a heating rate of 1 to 10K/min, preferably 2 to 5 K/min. In addition, during the heating an intermediate holding phase is preferably carried out at a temperature of 400 to 1000° C., preferably 550 to 900° C., for a duration of 1 to 3 h, preferably 1.5 to 2.5 h. Cooling preferably takes place freely in the kiln.

In addition, the sintering preferably takes place under neutral or oxidizing conditions.

In addition, the sintering preferably takes place in an electrically fired or gas-fired kiln. Gas-fired kilns have a regulable oxygen amount in the combustion air (excess or deficiency of oxygen), can reach higher heating rates, and usually have a (different) flow field of the gases in the combustion chamber, compared to electrically fired kilns.

In addition, the sintering takes place in a discontinuous or continuous process, in large-scale facilities, it preferably takes place in a continuous process.

As already explained, with the method according to the present invention it is in particular possible to produce a very pure, in particular a phase-pure, calcium zirconate material. The phase-pure calcium zirconate material produced according to the present invention thus has, in particular, no free raw materials and no mixed phases. Thus, a complete conversion of the used raw material components to calcium zirconate has taken place. At the least, the calcium zirconate material produced according to the present invention has a content of at least 98 wt %, preferably at least 99 wt %, CaZrO₃, relative to the dry mass of the calcium zirconate material.

An example of an x-ray phase diagram of a phase-pure calcium zirconate material produced according to the exemplary embodiment of the present invention is shown in FIG. 1.

In the context of the present invention, "phase-pure" means that, in an analysis of the phase composition using x-ray diffraction, no additional phases other than calcium zirconate are detected or are detectable. This can be seen clearly in FIG. 1. Because only peaks that can be attributed to calcium zirconate are present.

The phase analysis is carried out according to DIN 13925-2:2003. For this purpose, the dried, ground substance (<45 μm) is prepared in a sample holder. The testing apparatus is preferably the following: PHILIPS PW1820. The evaluation preferably takes place using the analysis software X'Pert Pro MPD (PANalytical B.V., Almelo, Netherlands). The background is determined according to Sonneveld & Visser. The reflexes are identified by the program automatically on the basis of the selection of the suitable PDF maps (up to this point the analysis is semi-quantitative).

Subsequently, the conversion into phases, the refinement of the scatter in semiautomatic mode, and subsequently a Rietveld analysis, are carried out in automated fashion, also using the program.

In addition, the sintered shaped bodies consisting of the calcium zirconate material according to the present invention preferably have an open porosity of 5 to 50 vol %, preferably 8 to 40 vol %, determined according to DIN EN 993-1:1995-04.

In addition, the sintered shaped bodies, in particular the sintered bricks, preferably have a bulk density of 2.50 to 4.50 g/cm$^3$, in particular 2.60 to 4.30 g/cm$^3$, determined according to DIN 993-1:1995-04.

Preferably, as explained above, for the further processing the sintered shaped bodies are mechanically comminuted after the sintering, preferably crushed and/or ground, and are subsequently classified into grain classes by sieving. The sieving is done in a sieve tower by dry sieving according to DIN EN 933-1:2012. Preferably, the sieving machine Retsch AS 200 Control is used, at 0.5 mm amplitude for 2 min.

The designation "grain fraction" or "grain class" means that no grains remain on the upper sieve, and no grains fall through the lower sieve. Thus, no oversized grain and no undersized grain is present. Grain classes thus each comprise grain sizes between the two indicated test grain sizes.

The pre-synthesized granular material according to the present invention has very good thermomechanical resistance.

In addition, the granular material produced according to the present invention preferably has a grain porosity (open porosity) according to DIN 66133:1993 of 5 to 50 vol %, preferably 10 to 40 vol %, and/or preferably has an average pore diameter ($d_{50}$) according to DIN 66133:1993 of 0.5 to 2 μm, preferably 0.8 to 1.2 μm.

In addition, the granular material produced according to the present invention preferably has a true density, determined by helium pycnometry according to DIN 66137-2:2004, of 4.40 to 4.70 g/cm$^3$, preferably 4.65 to 4.70 g/cm$^3$.

The granular material according to the present invention can then be used, in a known manner, in coarse ceramic batches for the production of the shaped or unshaped coarse ceramic refractory products.

If the sintered shaped bodies are pellets or granulate grains or the like, these can also be used directly as refractory granular material, without mechanical comminution.

Standardly, a coarse ceramic batch comprises a dry material mixture consisting of at least one refractory granular material and, additively, preferably binders and/or water and/or liquid admixtures. That is, the amount of binder (dry or liquid) and/or water and/or liquid admixture is added additively, and is relative to the total dry mass of the dry material mixture (not to the total mass of the batch).

In the case of unshaped products, the liquid and/or solid or dry, powdered binder and/or the liquid admixture are preferably packaged in a container separate from the other dry components of the batch.

The binder is a binder suitable for refractory products, preferably a temporary binder. These binders are indicated for example in the Practical Handbook, page 28/point 3.2.

The admixture is preferably a pressing aid.

According to the present invention, the dry material mixture comprises at least one coarse pre-synthesized calcium zirconate-containing granular material having a grain size >200 μm, preferably in an amount of 10 to 90 wt %, preferably 80 to 90 wt %, relative to the total dry mass of the dry material mixture, and/or at least one pre-synthesized mealy calcium zirconate-containing granular material having a grain size ≤200 μm, preferably in an amount of 0 to 30 wt %, preferably 10 to 20 wt %, relative to the total dry mass of the dry material mixture.

The grain sizes of the granular materials are determined by dry sieving according to DIN EN 933-1:2012.

In addition, instead of the mealy granular material of the calcium zirconate material, or in addition thereto, the dry material mixture can also contain at least one mealy Ca raw material component and at least one mealy $ZrO_2$ raw material component, from which additional calcium zirconate is formed in situ during the firing of the product. The Ca raw material component and the $ZrO_2$ raw material component are thus the raw material components indicated above. For the formation of a phase-pure calcium zirconate, the dry material mixture preferably contains the raw material components in an equimolar ratio.

Preferably, the dry material mixture comprises exclusively calcium zirconate-containing granular materials that are pre-synthesized according to the present invention and, if applicable, the at least one Ca raw material component and the at least one $ZrO_2$ raw material component, particularly preferably, the dry material mixture consists thereof.

However, the dry material mixture can also comprise at least one further coarse granular material having a grain size >200 μm, and/or at least one further mealy granular material having a grain size ≤200 μm, of other standard refractory materials.

In addition, the dry material mixture can comprise at least one dry additive for refractory materials, preferably in a total amount <5 wt %, and/or at least one dry admixture for refractory materials, preferably in a total amount <5 wt %.

The dry additive is an additive suitable for refractory products. These additives are indicated for example in the Practical Handbook, page 28/point 3.3. They are used to improve processability, or deformability, or to modify the structure of the products, so as to achieve particular properties.

In addition, the coarse grain fraction (=all coarse granular materials contained in the batch) of the dry material mixture preferably has a grain size up to a maximum of 8 mm, preferably up to a maximum of 6 mm, particularly preferably up to a maximum of 4 mm.

The grain distribution of the coarse grain fraction of the dry material mixture is preferably steady.

The grain distribution of the mealy grain fraction (=all mealy granular materials contained in the batch) of the dry material mixture is preferably also steady.

And the grain distribution of the total dry material mixture is also preferably steady.

In a known manner, in this context the coarse grain fraction acts as support grain. The binder matrix in which the coarse grain fraction is embedded is formed from the mealy grain fraction during the firing.

As explained above, the batch according to the present invention is used for the production of the unshaped or shaped, coarse ceramic products.

For the production of pressed products, in particular bricks, a mixture or plastic mass, is produced from the dry material mixture of the batch according to the present invention, with at least one liquid and/or solid binder and/or water and/or a pressing aid. If the batch contains a liquid binder and/or pressing aid, the addition of water is not necessary, but is possible. However, it is also possible to add water exclusively.

For the optimal distribution of the binder or the binders and/or of the water and/or of the pressing aid, mixing takes place for e.g. 3 to 10 minutes.

The mixture is placed into molds and pressed, so that shaped bodies are formed. The molding pressures are within standard ranges, e.g. 50 to 150 MPa, preferably 100 to 150 MPa.

Preferably, after the pressing, drying is carried out, e.g. at between 40 and 110° C., in particular between 100 and 105° C. The drying preferably takes place until a residual moisture is reached between 0 and 2 wt %, in particular between 0 and 1 wt %, determined according to DIN 51078: 2002-12.

The dried, pressed bricks can be used in the unfired state, or can be fired.

For the firing, the preferably dried, pressed bricks are fired ceramically in a ceramic burning kiln, e.g. a tunnel kiln, preferably between 1200 and 1800° C., in particular between 1400 and 1700° C. Firing preferably takes place in oxidizing fashion, however, depending on the material composition a reducing firing may also be advantageous.

The shaping of the shaped products can however also take place in some other standard manner, preferably by slip casting or an extrusion method of a plastic mixture or manual or mechanical stamping or ramming. In the case of slip casting, the mixture is correspondingly flowable.

Preferably, the fired, shaped products, in particular the bricks, have a bulk density of 4.00 to 4.70 g/cm$^3$, in particular 4.40 to 4.60 g/cm$^3$, determined according to DIN 993-1:1995-04.

The cold bending strength according to DIN EN 993-6: 1995-04 of the fired, shaped products according to the present invention, in particular the bricks, is preferably 10 to 40 MPa.

In addition, the fired, shaped products according to the present invention, in particular the bricks, preferably have a modulus of elasticity according to DIN EN ISO 12680-1: 2007-05 of 80 to 200 GPa, preferably 90 to 120 GPa.

For the production of unshaped products, in particular masses, preferably injection masses or vibration masses or casting masses or stoker masses, a mixture is likewise produced of the dry material mixture according to the present invention with at least one dry and/or liquid binder and/or water and/or at least one liquid admixture, and the mixture is placed e.g. behind a sheathing. If the batch contains a liquid binder and/or admixture, the addition of water is not necessary, but is possible. However, it is also possible to add only water.

As explained above, using the synthesis method according to the present invention it is possible to produce a, preferably phase-pure, calcium zirconate-containing material in a simple, economical, and ecologically harmless manner. The effort for the production method (mixing, pressing, firing, preferably crushing) is very low. In addition, the grain properties can be controlled easily via the sintering temperature. A higher sintering temperature results in a lower porosity. Granular materials having lower porosity are particularly well suited for use in casting masses. Preferably, granular materials for casting masses are sintered at >1550° C. The higher the bulk density of the pre-synthesized granular material, the lower the shrinkage during the firing of the material produced therefrom.

The unshaped and shaped products according to the present invention are used for example for the refractory lining, preferably for the working casing or the safety casing, of a coal gasification plant.

They can also be used as heat protection tiles in gas turbines, as inlay in a slide plate, as crucibles for titanium casting/titanium alloys (VIM), or as crucibles for other nonferrous metals (e.g. nickel-based alloys).

The superiority of the method according to the present invention and of the coarse ceramic products according to the present invention is further illustrated on the basis of the following examples:

Exemplary Embodiment 1 (Production of $CaZrO_3$ Granular Material From $CaCO_3$ and Unstabilized $ZrO_2$)

Table 1 shows, as an example, a composition for the production of a pressing mass. Calcium carbonate (PreCarb 400) of the company Schafer Kalk GmbH & Co, Diez, and monoclinic zirconium dioxide (ZirPro CS02) of the company Saint-Gobain, Le Pontet Cedex, France, were used.

TABLE 1

Composition for the production of a pressing mass:

| Material | Amount in wt % relative to the dry mass |
|---|---|
| $ZrO_2$ | 55.2 |
| $CaCO_3$ | 44.8 |
| Water | 8.0 |

First, the dry raw materials were weighed and placed into an intensive mixer. After mixing for 10 minutes, the water was added. The mixer was operated in counterflow operation (agitator and plate rotate in different directions). The moist mass was mixed for a further 10 minutes. The resulting mass was then placed into the press mold of the hydraulic press. Shaped bodies were pressed therefrom at a molding pressure of up to 50 MPa. After demolding, drying took place at 100° C. for 24 h. Subsequently, the samples were sintered at 1400° C. for 5 h, with a holding time during the run-up phase of 2 h at 900° C. The heating rate was 3 K min$^{-1}$. Cooling in the kiln took place freely. Subsequently, the material thus obtained was coarsely pre-comminuted and subsequently crushed into different grain sizes in a jaw crusher, and was then classified. XRD analysis showed only peaks attributable to $CaZrO_3$ (see FIG. 1). The material thus contained 100% $CaZrO_3$.

Exemplary Embodiment 2 (Production of a Shaped Body Resistant to Thermal Shock and Corrosion, Based on the Phase-Pure Calcium Zirconate of Exemplary Embodiment 1 Having Different Grain Fineness)

The following Table 2 shows a composition for the production of a coarse-grained refractory shaped body from $CaZrO_3$ synthesized for this purpose.

TABLE 2

Composition for the production of a coarse-grained refractory shaped body from $CaZrO_3$ synthesized for this purpose

| Material | Specification | Amount in wt % |
|---|---|---|
| $CaZrO_3$ | <0.16 mm | 33.4 |
| | 0.16-0.63 mm | 34.1 |
| | 0.63-1.0 mm | 9.8 |
| | 1.0-2.0 mm | 15.4 |
| | 2.0-3.15 mm | 7.3 |
| Binder: polyvinyl alcohol | Optapix PAF 60, ZSCHIMMER & SCHWARZ GmbH & Co KG—CHEMISCHE FABRIKEN, Lahnstein | 3.5 |

For the production of the pressing mass, first the dry raw materials were weighed, and were filled into the mixing container in the order from fine to coarse. For the mixing, a ToniMix building material mixer of the company Toni Technik BaustoffprUfsysteme GmbH was used. The dry raw materials were mixed for 5 min. Subsequently, the binder was added, and the whole was mixed for a further 5 min. After this, the press shaping took place in a hydraulic uniaxial press. Test bodies were produced at 150 MPa. After a brief drying at 100° C. for 4 h, sintering took place at 1650° C. for 6 h, with a holding time during the run-up phase at 900° C. for 2 h. The heating rate was 2 K min$^{-1}$. Table 3 shows selected properties of the material produced in this way.

TABLE 3

Properties of the produced material

| | Unit | Value |
|---|---|---|
| Bulk density according to DIN 993-1:1995 | g/cm$^{-3}$ | 4.30 |
| True density | g/cm$^{-3}$ | 4.66 |
| Open porosity according to DIN 993-1:1995 | vol % | 7.28 |
| Total porosity according to DIN 993-1:1995 | vol % | 8.52 |
| Cold bending strength, based on DIN 993-6:1995 (bearing spacing 100 mm) | MPa | 35.54 |
| Cold bending strength after 5 thermal shock cycles, according to DIN 993-11:2008 and based on DIN 993-6:1995 (bearing spacing 100 mm) | MPa | 4.89 |
| Loss of strength after 5 thermal shock cycles | % | 86 |
| Modulus of elasticity after  0 | GPa | 95.70 |
|   1 | | 84.18 |
|   3 | | 40.47 |
|   5 | | 31.39 |
| thermal shock cycles, according to DIN EN ISO 12680-1:2007 | | |
| Loss of modulus of elasticity after 5 thermal shock cycles | % | 67 |

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A synthesis method for a synthesis of a refractory oxide-ceramic, calcium zirconate-containing material, having the following method steps:
   a) producing a mixture of at least one mealy Ca raw material component, at least one mealy $ZrO_2$ raw material component, and water, wherein a molar ratio of $CaO/ZrO_2$ in the mixture is 1.5:1 to 1:1.6,
   b) pressing the mixture to form at least one green shaped body,
   c) sintering the at least one green shaped body,
   wherein the mixture that is produced from step a) consists exclusively of the at least one mealy Ca raw material component, the at least one mealy $ZrO_2$ raw material component and water, and the mixture that is produced from step a) comprises a water content of more than 5 wt. % and equal or less than 10 wt. % relative to a dry mass of the mixture that is produced from step a).

2. The synthesis method according to claim 1, wherein the molar ratio of $CaO/ZrO_2$ in the mixture is 1:1.

3. The synthesis method according to claim 1, wherein the refractory oxide-ceramic calcium zirconate-containing material is produced having a content of at least 98 wt % $CaZrO_3$, relative to a dry mass of the material.

4. The synthesis method according to claim 3, wherein the refractory oxide-ceramic calcium zirconate-containing material is produced having a content of at least 99 wt % $CaZrO_3$, relative to the dry mass of the material.

5. The synthesis method according to claim 1, wherein the refractory oxide-ceramic calcium zirconate-containing material is produced being a phase-pure calcium zirconate-containing material.

6. The synthesis method according to claim 1, wherein the at least one Ca raw material component is selected from the group consisting of:
   a raw material component containing $CaCO_3$, a raw material component containing CaO, a raw material component containing $Ca(OH)_2$, a raw material component containing $CaC_2$ and mixtures thereof.

7. The synthesis method according to claim 6, wherein the raw material component containing $CaCO_3$ is selected from the group consisting of:
   natural, ground limestone meal, synthetic, precipitated calcium carbonate, chalk, and mixtures thereof;
   or quicklime is used as the raw material component containing CaO; or hydrated lime is used as the raw material component containing $Ca(OH)_2$.

8. The synthesis method according to claim 1, wherein synthetically produced, zirconium dioxide is used as the at least one mealy $ZrO_2$ raw material component.

9. The synthesis method according to claim 1, wherein the at least one mealy Ca raw material component and the least one mealy $ZrO_2$ raw material component each have a purity of at least 96 wt %.

10. The synthesis method according to claim 1, wherein the at least one mealy Ca raw material component has a grain size of ≤200 μm, according to DIN EN 725-5:2007 or an average grain diameter of the mealy Ca raw material component is 500 nm to 5 μm.

11. The synthesis method according to claim 1, wherein the at least one mealy $ZrO_2$ raw material component has a grain size of ≤200 μm, according to DIN EN 725-5:2007 or an average grain diameter of the mealy $ZrO_2$ raw material component is 500 nm to 5 μm.

12. The synthesis method according to claim 1, wherein the pressing takes place with a molding pressure of 30 to 150 N/mm$^2$.

13. The synthesis method according to claim 1, wherein the pressing takes place by uniaxial or isostatic pressing.

14. The synthesis method according to claim 1, wherein a cuboidal green shaped body is produced.

15. The synthesis method according to claim 1, wherein the at least one green shaped body is produced having at least one of the following properties:
   a bulk density, determined according to DIN EN 993-17:1999, of 2.0 to 3.0 g/cm$^3$,
   a porosity according to DIN 66133:1993-06 of 30 to 60 vol %, or
   a cold bending strength, according to DIN EN 993-6:1995-04, of at least 1 MPa.

16. The synthesis method according to claim 1, wherein the at least one green shaped body is dried to a residual moisture between 0 and 2 wt %, determined according to DIN 51078:2002-12.

17. The synthesis method according to claim 1, wherein the at least one green shaped body is sintered with a holding phase at a final temperature of 1200 to 1800° C., for a duration of 2 to 10 h.

18. The synthesis method according to claim 1, wherein during the sintering, an intermediate holding phase is carried out at a temperature of 400 to 1000° C., for a duration of 1 to 3 h.

19. The synthesis method according to claim 1, wherein during the sintering, heating takes place at a heating rate of 1 to 10 K/min.

20. The synthesis method according to claim 1, wherein the sintering takes place in an electrically fired kiln or a gas-fired kiln.

21. The synthesis method according to claim 1, wherein a sintered shaped body is produced having at least one of the following properties:
an open porosity of 5 to 50 vol %, determined according to DIN EN 993-1:1995-04, or
a bulk density of 2.50 to 4.50 g/cm$^3$, determined according to DIN 993-1:1995-04.

22. The synthesis method according to claim 1, wherein the mixture that is produced from step a) comprises a water content of 7 to 8 wt %, relative to the dry mass of the mixture that is produced from step a).

23. The synthesis method according to claim 1, wherein the refractory oxide-ceramic, calcium zirconate-containing material which is produced is a granular material.

24. The synthesis method according to claim 23, wherein a granular material is produced having at least one of the following properties:
a true density, determined by helium pycnometry according to DIN 66137-2:2004, of 4.40 to 4.70 g/cm$^3$, or
being mechanically comminuted and having a grain porosity (open porosity) according to DIN 66133:1993 of 5 to 50 vol %, or having an average pore diameter ($d_{50}$) according to DIN 66133:1993 of 0.5 to 2 μm.

25. The synthesis method according to claim 23, further comprising:
forming a batch comprising the granular material as at least one pre-synthesized, calcium zirconate-containing granular material.

26. The synthesis method according to claim 25, wherein the at least one pre-synthesized calcium zirconate-containing granular material has a grain size >200 μm or the batch comprises at least one pre-synthesized mealy calcium zirconate-containing granular material having a grain size ≤200 μm.

27. The synthesis method according to claim 25, wherein the batch comprises
a) a dry material mixture having the at least one pre-synthesized calcium zirconate-containing granular material and
b) at least one of the following components: liquid binder, dry binder, water, liquid admixture.

28. The synthesis method according to claim 27, wherein the dry material mixture comprises at least one of the following components:
at least one coarse pre-synthesized calcium zirconate-containing granular material having a grain size >200 μm in an amount of 10 to 90 wt %, relative to a total dry mass of the dry material mixture,
at least one pre-synthesized mealy calcium zirconate-containing granular material having a grain size ≤200 μm, or
at least one further mealy Ca raw material component and at least one further mealy ZrO$_2$ raw material component.

29. The synthesis method according to claim 27, wherein the dry material mixture consists of the at least one pre-synthesized calcium zirconate-containing granular material and at least one further Ca raw material component and at least one further ZrO$_2$ raw material component.

30. The synthesis method according to claim 25 further comprising:
forming a product from the batch, wherein the product comprises a coarse ceramic refractory shaped or unshaped product.

31. The synthesis method according to claim 30, wherein the product is a casting mass and the pre-synthesized calcium zirconate-containing granular material has a grain porosity (open porosity) according to DIN 66133:1993 of 5 to 15% or is produced by sintering at >1550° C.

32. The synthesis method according to claim 30, wherein the product is fired or unfired.

33. The synthesis method according to claim 30, wherein the product is a component of a refractory lining of a coal gasification plant or the product is a heat protection tile in gas turbines or an inlay in a slide plate or a crucible for nonferrous metals.

34. The synthesis method according to claim 33, wherein the product is a component of a working casing or a safety casing of a coal gasification plant.

35. The synthesis method according to claim 33, wherein the product is a crucible for titanium casting or titanium alloys or for nickel-based alloys.

36. The synthesis method according to claim 23, wherein, to form the granular material, the sintered shaped body is mechanically comminuted.

37. The synthesis method according to claim 36, wherein the sintered shaped body is crushed, or ground, or crushed and ground.

38. The synthesis method according to claim 1, wherein the green shaped body formed from step b) is dried.

\* \* \* \* \*